United States Patent [19]
Iga et al.

[11] Patent Number: 5,821,974
[45] Date of Patent: Oct. 13, 1998

[54] COLOR PRINTER

[75] Inventors: Kaname Iga; Hidemi Mihara; Takashi Ichikawa, all of Shizuoka-ken; Kazuhiro Fushimi, Mishima, all of Japan

[73] Assignee: Kabushiki Kaisha TEC, Shizuoka, Japan

[21] Appl. No.: 721,707

[22] Filed: Sep. 27, 1996

[30] Foreign Application Priority Data

Sep. 29, 1995 [JP] Japan ................................. 7-254226

[51] Int. Cl.$^6$ ............................................ B41J 5/30
[52] U.S. Cl. ............................................ 347/211; 305/116
[58] Field of Search ............................ 347/173, 211; 400/82, 120.01, 120.02, 120.05; 346/76.1; 395/115, 116, 507, 518, 521, 842, 848

[56] References Cited

U.S. PATENT DOCUMENTS

| 4,528,576 | 7/1985 | Koumura et al. ..................... 347/15 |
| 4,694,305 | 9/1987 | Shiomi et al. . | |

FOREIGN PATENT DOCUMENTS

| 0050481 A2 | 4/1982 | European Pat. Off. . | |
| 0664521 A2 | 7/1995 | European Pat. Off. . | |
| 0665112 A2 | 8/1995 | European Pat. Off. . | |
| 406238960 | 8/1994 | Japan ..................................... 395/116 |

OTHER PUBLICATIONS

Patent Abstracts of Japan, vol. 007, No. 081 (M–205), Apr. 5, 1983 & JP 58 007393 A (Daini Seikosha KK), Jan. 17, 1983.
Patent Abstracts of Japan, vol. 010, No. 234 (M–507), Aug. 14, 1986 & JP 61 068270 A (Fuji Xerox CO., Ltd.), Apr. 8, 1986.
Patent Abstracts of Japan, vol. 012, No. 416 (M–759), Nov. 4, 1988 & JP 63 154374 A (Fujitsu Ltd.), Jun. 27, 1988.
Patent Abstracts of Japan, vol. 014, No. 432 (M–1026), Sep. 17, 1990 & JP 02 171254 (NEC Corp.), Jul. 17, 1990.

*Primary Examiner*—N. Le
*Assistant Examiner*—An Hvo
*Attorney, Agent, or Firm*—Frishauf, Holtz, Goodman, Langer & Chick

[57] ABSTRACT

Of a plurality of page memories for storing printing data corresponding to the printing heads, at least the page memory is associated with an auxiliary memory for storing at least two continuous pages of printing data for at least one printing head, wherein a printing data write unit executes a process for writing the next page of printing data in one of the page memory and the auxiliary memory while the printing data stored in the other one of the page memory and the auxiliary memory is being printed, and the image processing unit supplies printing data continuously and alternately from the page memory and the auxiliary memory to each corresponding printing head.

9 Claims, 7 Drawing Sheets

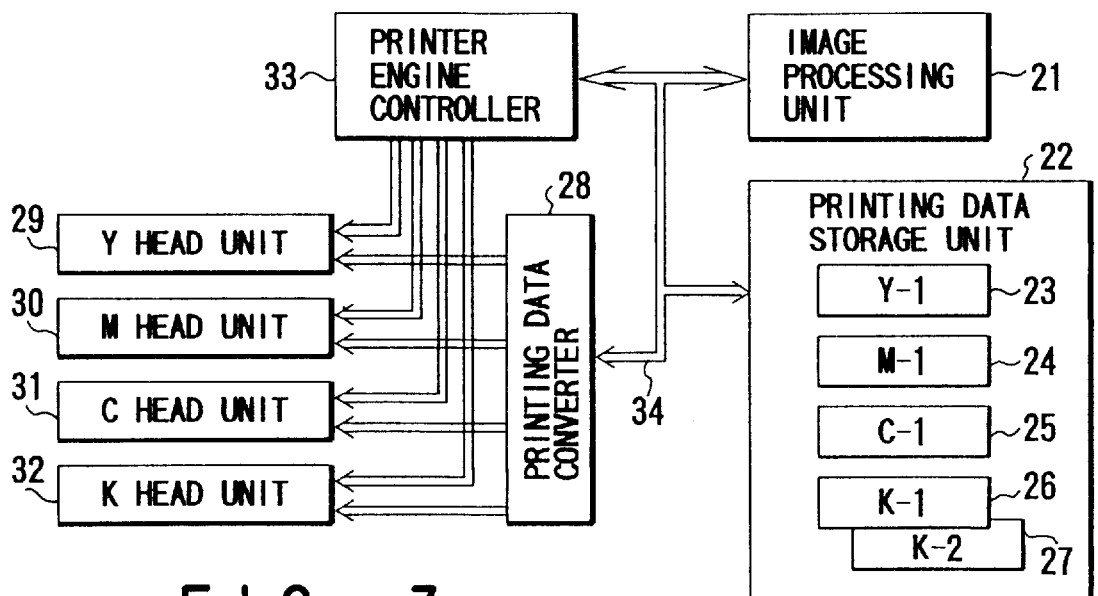
F I G. 3
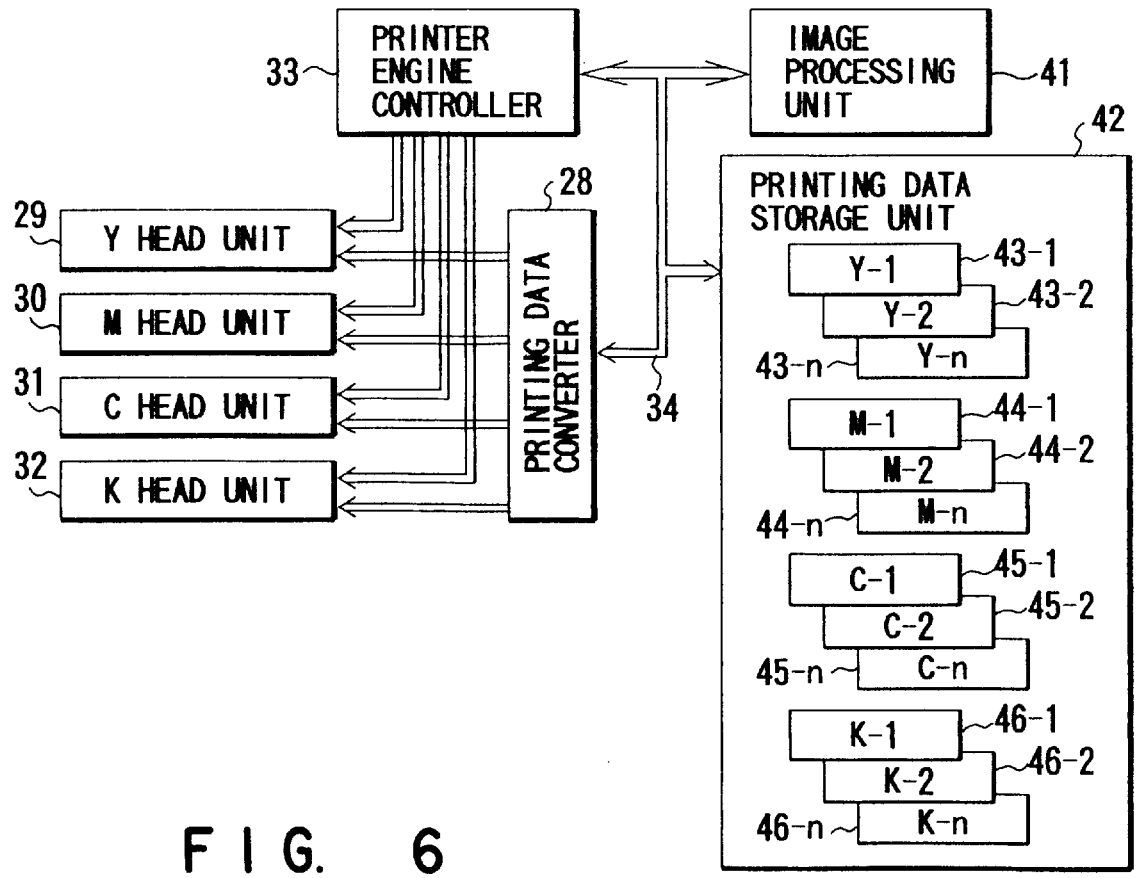
F I G. 6

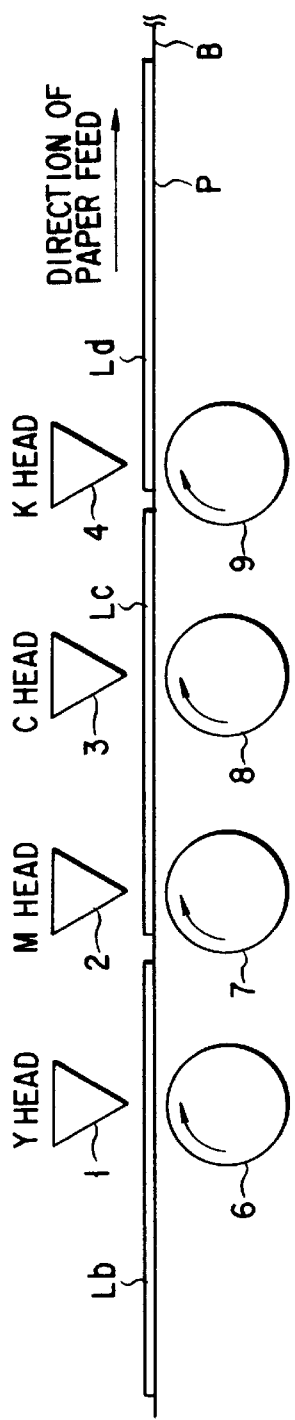

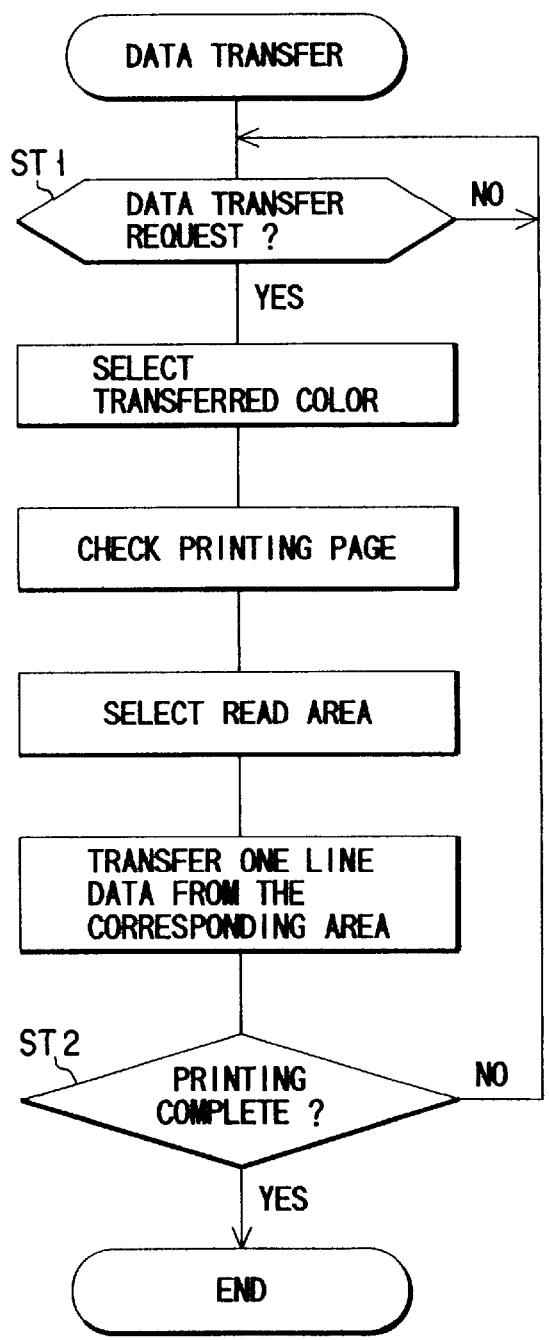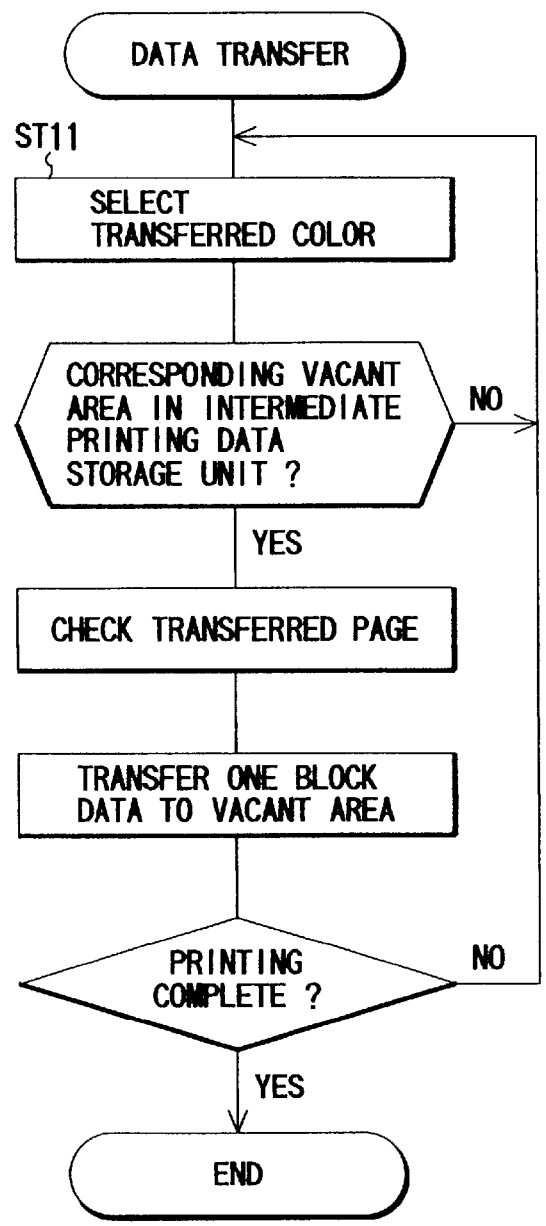
FIG. 7
FIG. 9

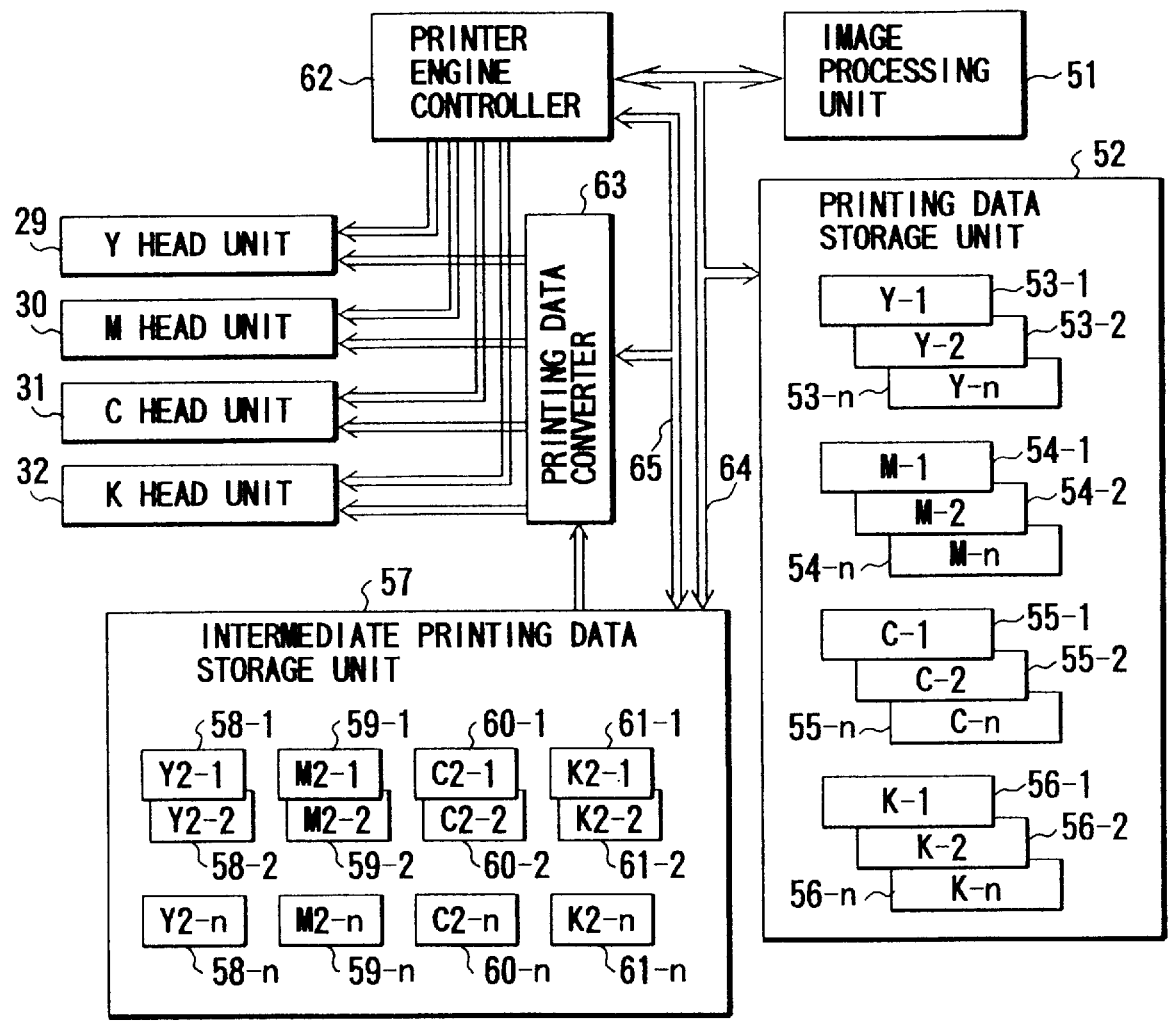
F I G. 8

COLOR PRINTER

Background of the Invention

1. Field of the Invention

The present invention relates to a color printer comprising a plurality of printing heads arranged sequentially along the direction in which long printing paper is fed and a plurality of page memories each for storing a page of image data corresponding to each of the printing heads, wherein color components of an image are printed in superposed relation on the printing paper on the basis of each page of image data supplied from the page memory corresponding to each printing head in the order in which the printing paper is fed thereby to perform the desired color printing.

2. Description of the Related Art

FIG. 1 shows an example of a set of labels 100, 200, 300, 400 printed by print units having four printing heads such as thermal line heads not shown of yellow, magenta, cyan and black arranged sequentially along the direction in which the printing paper P is fed. These labels 100, 200, 300, 400 are printed in the manner described below.

The four print units are located in such relative positions that when the leading portion of an area on the printing paper P to be printed with label 400 is transported to the position of the black print unit, the leading portion of label 300 is located at the position of the cyan print unit, the leading portion of label 200 at the position of the magenta print unit, and the leading portion of label 100 at the position of the yellow print unit. Labels 100 to 400 have hatched outer frames 101a, 101b, 101c, 101d respectively of the same shape. Amount frames 102a to 102d and item frames 103a to 103d inside the outer frames 101a to 101d, respectively, have also the same shape.

When labels 100, 200, 300, 400 are printed, label image data stored in each page memory connected with each print unit corresponding to each label position is read out and supplied to the thermal line head of the print unit. In the case where the outer frames 101c, 101b, 101a of labels 300, 200, 100 are to be printed sequentially in superposed colors, for example, the print units corresponding to yellow, magenta and cyan are supplied with the image data of the outer frames 101a, 101b, 101c from the corresponding memories, respectively. The outer frames 101a, 101b, 101c, therefore, are printed yellow by the print unit at the position of label 100 when arriving at the position of label 100, printed magenta by the print unit at the position of label 200 when arriving at the position of label 200, and printed cyan by the print unit at the position of label 300 when arriving at the position of label 300. In this way, each color is printed in superposed relation in synchronism when the portion to be printed in color arrives at the heat generating surface of the head of each print unit. In the process, inks of different colors are superposed and mixed thereby to print with a predetermined hue. The outer frames 101a, 101b, 101c, which have the same size and shape, can be printed without rewriting the image data stored in each page memory.

The amount frames 102a to 102d and the item frames 103a to 103d, which also have the same size and shape, respectively, can be printed in color in similar fashion without rewriting the image data stored in each page memory.

In a thermal transfer color recording method having a plurality of thermal line heads each for one color described above, the paper P is not reciprocated for each color unlike in the single-head system, and therefore high-speed printing is made possible.

The amounts and names of commodities are printed black in the amount frames 102a to 102d and the item frames 103a to 103d in the outer frames 101a to 101d. As seen from FIG. 1, however, the contents to be printed, i.e., the amounts and the names of commodities are different for different labels 100 to 400. When labels 100 to 400 are printed continuously, therefore, the printing data are required to be changed with labels. In the case of FIG. 1, for example, the thermal line head for printing black is arranged at the position of label 400. After label 400 is printed black, the black printing data for label 300 is required to be fetched and stored in the corresponding page memory before the next label 300 is transferred to the position of label 400 and begins to be printed by the black printing head.

In other words, data on label 300 is required to have been fetched and stored during the period from the time when label 400 begins to be printed black to the time when the next single label 300 begins to be printed black.

In the case where different printing data are printed in labels 400, 300, 200 and 100 in that order by the black printing head, as described above, a predetermined length of time is required for fetching and storing the next page of printing data during the period when the preceding label is actually printed, resulting in the problem of a limited printing speed.

Suppose that the printing speed is increased without taking this fetch and storage period into consideration. When the next page data is to be printed black, for example, the problem is posed that the paper feed and the printing operation of the remaining color heads is required to be suspended until the next page data replacing the page data that has been printed is fetched and stored in the corresponding page memory.

In the conventional color printer, as described above, a period of time is required for rewriting the next printing data in a memory in the presence of different printing data for different pages, and therefore it is difficult to increase the printing speed.

SUMMARY OF THE INVENTION

Accordingly, the object of the present invention is to provide a color printer capable of continuous printing with a higher printing speed without any period for rewriting the printing data stored in a page memory even in the case where different pages have different printing data.

According to one aspect of the invention, there is provided a printer comprising a plurality of printing heads arranged sequentially along a direction in which the printing paper is fed and a plurality of page memories for storing printing data of one page for each printing head, wherein an image is printed on a printing medium sequentially by each printing head on the basis of printing data of one page supplied from the corresponding page memory, the color printer further comprising a main page memory and an auxiliary memory for storing at least two continuous pages of printing data corresponding to at least one printing head, printing data write means for writing a next page of printing data in one of the main page memory and the auxiliary memory while the printing data stored in the other one of the main page memory and the auxiliary memory is printed, and print control means for supplying each printing head with printing data continuously and alternately from the corresponding main page memory and the corresponding auxiliary memory.

As described above, at least one of a plurality of printing heads supplied with different printing data for different pages and arranged sequentially along the direction in which the long printing paper is fed is provided with a main page memory and an auxiliary memory. While one of the main page memory and the auxiliary memory is used for printing, the printing data can be fetched and stored in the other. A continuous and high-speed printing can thus be achieved.

According to another aspect of the invention, there is provided a printer comprising a plurality of printing heads arranged sequentially along the direction in which long printing paper is fed and a plurality of page memories each for storing a page of printing data for each printing head, wherein an image is printed on a printing medium by each printing head sequentially on the basis of printing data of one page supplied from each corresponding page memory, the printer further comprising a main page memory and an auxiliary memory for storing at least two continuous pages of printing data corresponding to at least one printing head, printing data write means for writing the next page of printing data in one of the main page memory and the auxiliary memory while the printing data stored in the other one of the main page memory and the auxiliary memory is printed, an intermediate memory divided into blocks of a predetermined number of lines for each corresponding printing head, and printing control means for transferring printing data of the predetermined number of lines from a corresponding main page memory and an auxiliary memory to the intermediate memory and supplying printing data sequentially from the intermediate memory to the printing head.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a block diagram showing a circuit configuration of the essential parts of a color printer according to the first embodiment.

FIGS. 5A to 5E are diagrams showing the printing timings of each head of a color printer according to the same embodiment.

FIG. 6 is a block diagram showing a circuit configuration of the essential parts of a color printer according to a second embodiment of the present invention.

FIG. 7 is a diagram showing the flow of data transfer performed by a CPU included in an image processing unit of a color printer according to the second embodiment.

FIG. 8 is a block diagram showing a circuit configuration of the essential parts of a color printer according to a third embodiment of the invention.

FIG. 9 is a diagram showing the flow of data transfer performed by an image processing unit of a color printer according to the same embodiment.

DETAILED DESCRIPTION OF THE PREFERRED EMBODIMENTS

A first embodiment of the invention will be described with reference to FIGS. 1 to 3, 4A, 4B and 5A to 5E. The first embodiment refers to the case in which the labels shown in FIG. 1 are printed in color.

Figure 1:
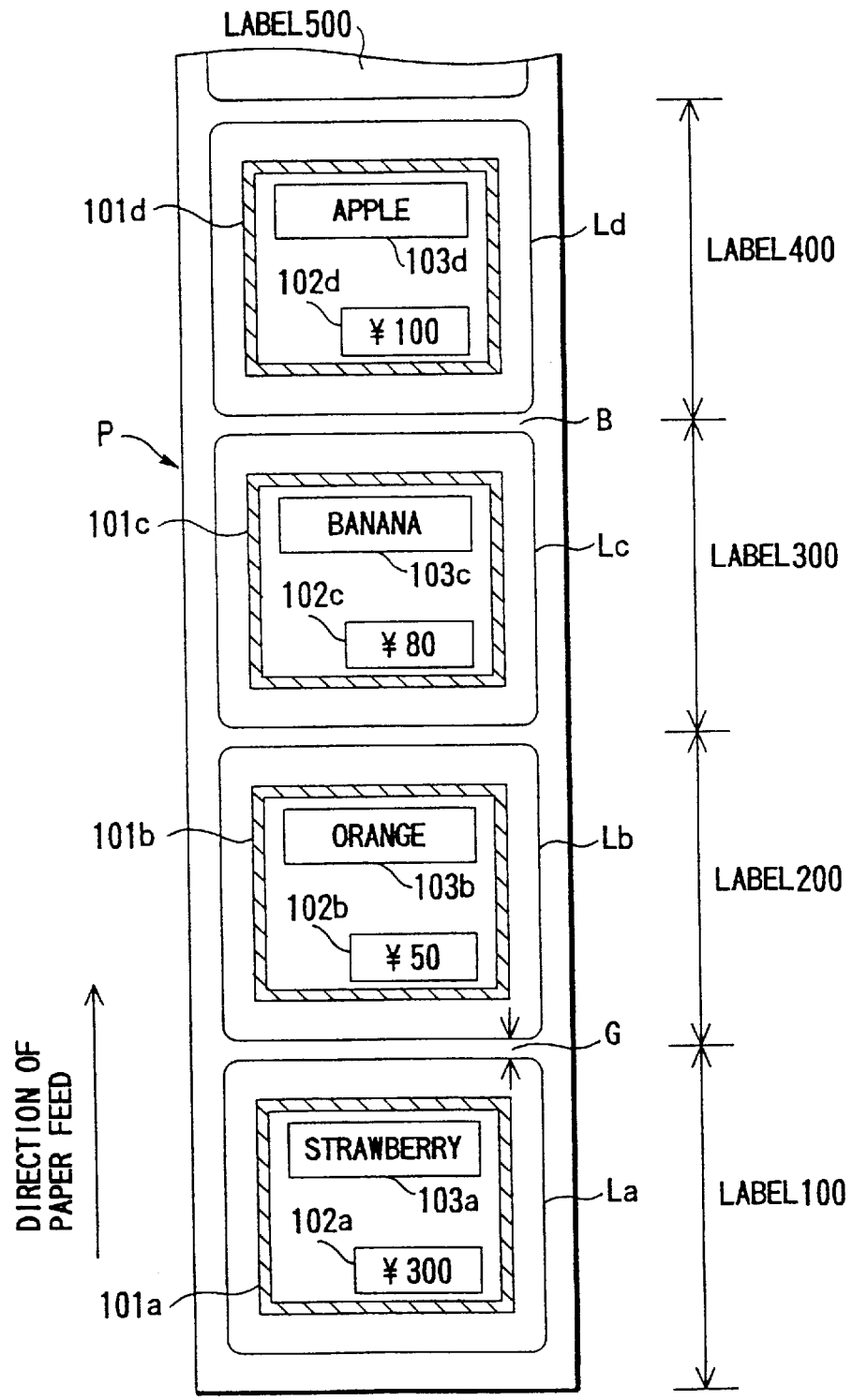
FIG. 1 is a plan view showing labels printed by a multi-head color printer having a plurality of printing heads arranged sequentially along the direction in which the printing paper is fed.
Figure 2:
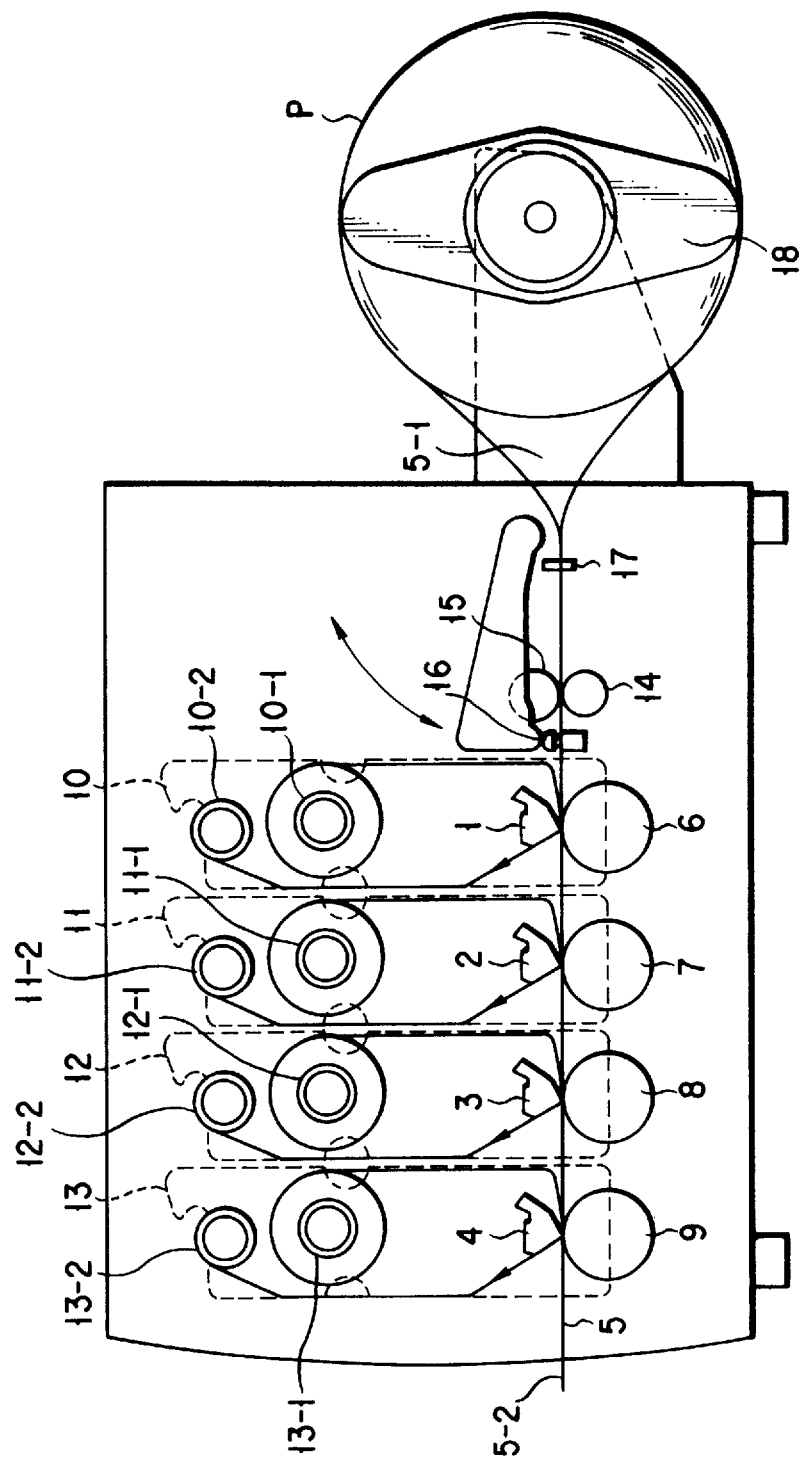
FIG. 2 is a schematic diagram showing a configuration of the essential parts of a color printer according to an embodiment of the present invention.

FIG. 2 is a schematic diagram showing a configuration of the essential parts of a color printer according to the first embodiment of the invention for printing the labels of FIG. 1 in four colors of yellow (Y), magenta (M), cyan (C) and black (K) in superposed relation or in one of the colors.

Image printing heads including a yellow head 1, a magenta head 2, a cyan head 3 and a black head 4 (hereinafter referred to as the Y head 1, the M head 2, the C head 3 and the K head 4, respectively) are thermal line heads having a plurality of heating resistors with printing tips thereof aligned each at a 4-inch-long parallelopipedal printing end across the feeding direction of paper P. The heads are arranged at a predetermined spatial interval with each other sequentially on a transport path 5 along the main scanning direction in which the paper P is fed. This predetermined interval is so set, for example, that three heads coincide with a length of a label Lc as shown in FIG. 5A.

The Y to K heads 1 to 4 have Y to K platens 6 to 9, respectively, arranged in opposed relation thereto. Also, ribbon magazines 10 to 13 are adapted to be removably set in the heads.

The ribbon magazines 10 to 13 include supply rollers 10-1 to 13-1 having unused ink ribbons wound thereon and take-up rollers 10-2 to 13-2 for taking up the used ink ribbons, respectively.

The ribbon magazines 10 to 13, in which a yellow ink ribbon, a magenta ink ribbon, a cyan ink ribbon and a black ink ribbon are set respectively, are adapted to supply these ribbons to each of the thermal heads 1 to 4.

A paper feed roller 14 for controlling the feed rate of the paper P and an auxiliary roller 15 in opposed relation to the paper feed roller 14 are arranged on the paper supply side of the Y thermal head 1 on the paper feed path 5.

A sensor unit 16 including a gap sensor for detecting a gap G between paper labels and a mark sensor for detecting a mark printed on the paper P is arranged on the transport path 5 between the paper feed roller 14 and the Y thermal head 1.

Also, a paper end sensor unit 17 including an optical transmission sensor for detecting the trailing end of the paper P is arranged in the vicinity of a paper supply port 5-1 nearer to the paper supply side than the paper feed roller 14 on the transport path 5.

A paper holder 18 is fixed outside of the paper supply port 5-1 of the transport path 5. The paper holder 18 has wound thereon the paper P as a long printing medium. The paper P includes a plurality of label sheets La to Ld adhered on a mount B at predetermined spatial intervals G as shown in FIG. 1.

A paper discharge port 5-2 for delivering the printed paper P is provided on the side of the transport path 5 opposite to the paper supply port 5-1.

The ink ribbons from the ribbon magazines 10 to 13 and the paper P from the paper holder 18 are fed substantially at equal speed between the thermal heads 1 to 4 and the platens 6 to 9.

Desired images of yellow, magenta, cyan and black are thus formed in that order on labels 100, 200, and so on by this color printer.

FIG. 3 is a block diagram showing a circuit configuration of the essential parts of this color printer.

An image processing unit 21 includes a CPU (central processing unit), a ROM (read-only memory) and a RAM (random access memory) for producing, editing and storing printing data while at the same time controlling the transfer of the printing data among the units.

Printing data of a label produced and edited by the image processing unit 21 are temporarily stored as bit map data in a Y-1 area 23, an M-1 area 24, a C-1 area 25 and a K-1 area 26 for storing the colors of yellow, magenta, cyan and black, respectively, and a K-2 area 27 used in association with the K-1 area 26, formed in the printing data storage unit 22.

The Y-1 area 23, the M-1 area 24, the C-1 area 25 and the K-1 area 26 constitute a first page memory, and the K-2 area 27, as described in detail later, is configured as an auxiliary memory of the K-1 area memory 26.

The K-1 area 26 and the K-2 area 27 are both for storing bit map data plotted from the black printing data including different characters and numerical values for different labels. As described later, two alternate sets of labels of black printing data are temporarily stored in the K-1 area 26 and the K-2 area 27, respectively. According to this embodiment, first, third and other odd-numbered labels of image data are stored in the K-1 area 26, while second, fourth and other even-numbered labels of image data are stored in the K-2 area 27.

The image processing unit 21 subjects each line of the image data stored in the areas 23 to 27 to parallel-serial conversion and other processes through a printing data converter 28. The data thus processed are supplied to the heads 1 to 4 and a Y head unit 29, an M head unit 30, a C head unit 31 and a K head unit 32 making up a circuit for driving the heads 1 to 4. Image processing unit 21 and printing data converter 28 function together as a printing data write means for writing a next page of the printing data in the auxiliary page memory 27 while the printing data stored in the first page memory 26 is being printed, and also function together as a print control means for supplying the printing data to the printing head alternately and continuously from first page memory 26 and corresponding auxiliary page memory 27.

A printer engine controller 33 is for controlling the print timing of the units 29 to 32 and performs the printing operation on the basis of the printing data supplied thereto through the printing data converter 28.

The image processing unit 21 and the printer engine controller 33 are connected to the printing data storage unit 22 and the printing data converter 28 through a system bus 34.

Figure 4A:
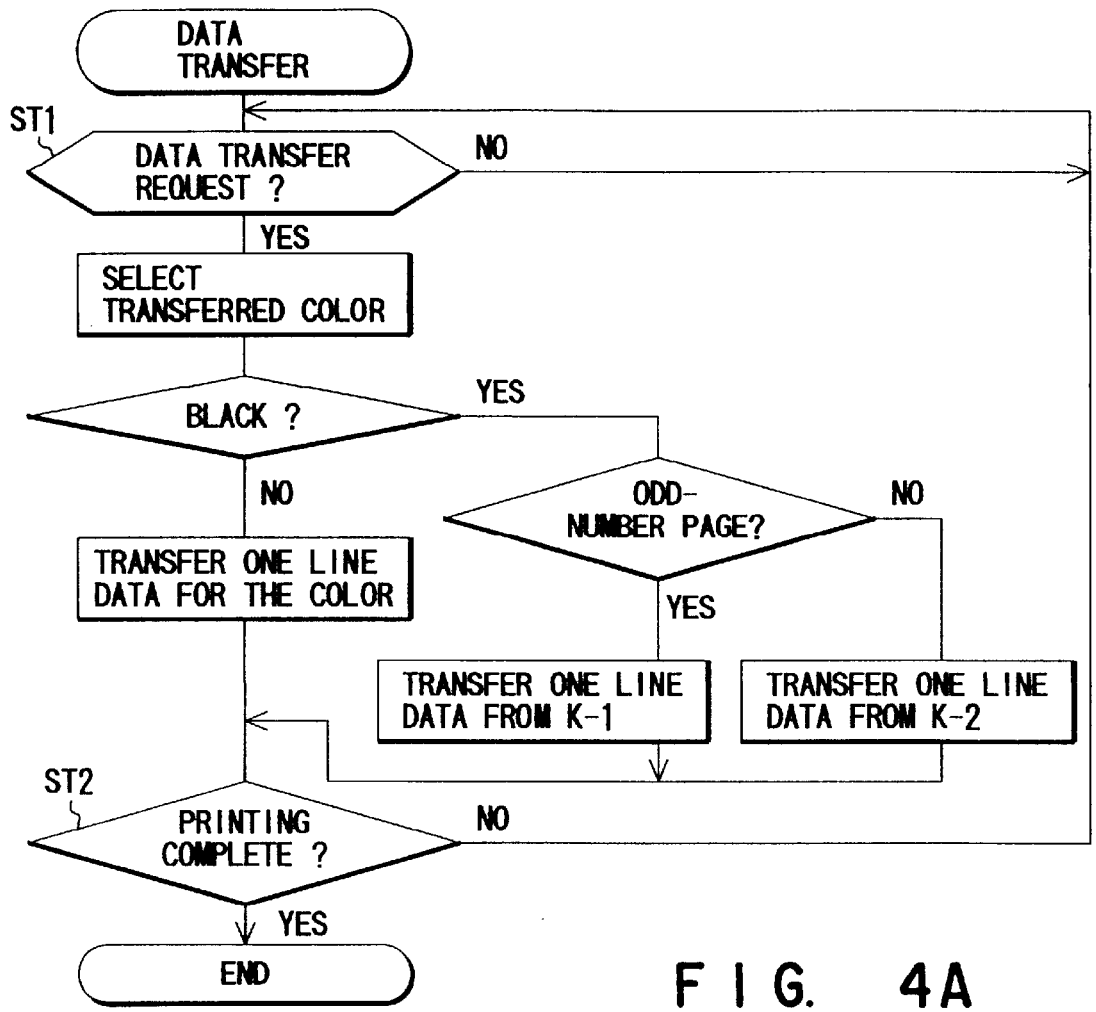
FIGS. 4A, 4B are diagrams showing the flow of the data transfer and the black-data plotting and storage process performed at regular intervals of time by an image processing unit of a color printer according to the first embodiment.

FIG. 4A is a diagram showing the flow of data transfer performed by the CPU of the image processing unit 21.

First, step ST1 waits for a data transfer request from the printer engine controller 33. This waiting mode can be interrupted by other processes.

Upon receipt of a data transfer request from the printer engine controller 33, a color is selected according to the data transfer request and whether the selected color is black or not is decided.

When the decision is that the selected color is not black, the leading line of data being printed is transferred from the storage area of the printing data storage unit 22 corresponding to the particular color to the printing data converter 28, and the process proceeds to step ST2. In the case where the color is yellow, for example, the leading line of the data is transferred from the Y-1 area 23 to the printing data converter 28.

When the decision is that the selected color is black, on the other hand, whether the page of the printing data being printed is an odd-numbered one (an odd-numbered label) or not. In the case where the printing data is for an odd-numbered page, the leading line of data being printed is transferred from the K-1 area 26 to the printing data converter 28, followed by the process proceeding to step ST2.

In the case where the decision is that the printing data is not for an odd-numbered page but for an even-numbered page (for an even-numbered label), the leading line of the data is transferred from the K-2 area 27 to the printing data converter 28, followed by step ST2.

Step ST2 decides whether the printing has ended or not. In the case where the decision is that the printing is not ended, the process returns to step ST1. In the case where the decision is that the printing has ended, on the other hand, the data transfer process is terminated.

Figure 4B:
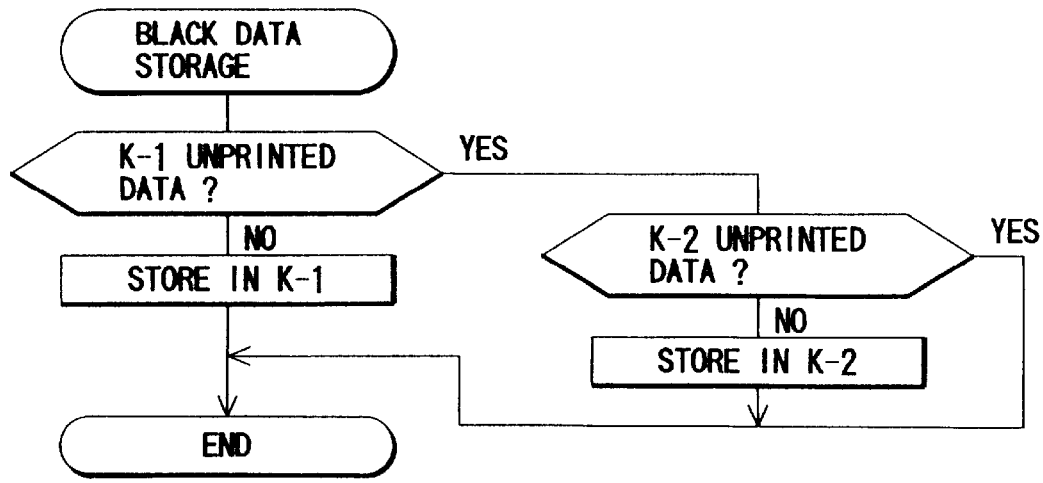

FIG. 4B is a chart showing the flow of the black data fetching and storing process performed at predetermined time intervals (by interrupt or the like) by the image processing unit 21.

First, it is decided whether unprinted data is stored in the K-1 area 26.

In the case where the decision is that unprinted data is not stored in the K-1 area 26, the black printing data of the next odd-numbered page to be printed, if any, is fetched and stored in the K-1 area 26 as bit map data, thereby terminating the black data storing process.

In the case where the decision is that unprinted data is stored in the K-1 area 26, on the other hand, it is decided whether unprinted data is stored in the K-2 area or not.

In the case where the decision is that unprinted data is not stored in the K-2 area 27, the black printing data of the next even-numbered page to be next printed, if any, is fetched and stored as bit map data. Upon termination of this storage process, the black data storage process is terminated.

In the case where the decision is that unprinted data is stored in the K-2 area 27, the black data storing process is terminated.

According to this embodiment having the above-mentioned configuration, the printing operation is performed at timings as shown in FIGS. 5A to 5E thereby to print labels 100, 200 and so on, as shown in FIG. 1.

More specifically, the Y head 1, the M head 2 and the C head 3 perform the printing operation on the basis of the same printing data supplied from the Y-1 area 23, the M-1 area 24 and the C-1 area 25, respectively. The K-head 4 performs the printing operation, however, on the basis of the printing data which is different for each page supplied alternately from the K-1 area 26 and the K-2 area 27.

In the case of FIG. 1, for example, the black printing data of the first label 300 is fetched and stored in the K-1 area 26. The black printing data of the second label 200 is then stored in the K-2 area 27.

The printing operation is started. The image processing unit 21 transfers the printing data from the K-1 area 26 to the printing data converter 28 for each line. As a result, a black image including the commodity name of "apple" and the amount of "¥100" is printed black in the commodity frame 103c and the amount frame 102c, respectively, of the first label 300.

Upon complete termination of the transfer of one-page printing data (a sheet of label 300) stored in the K-1 area 26, the printing data is transferred to the printing data converter 28 for each line from the K-2 area 27. As a result, a black image, i.e., the commodity name of "orange" and the amount of "¥50" are printed black in the commodity frame 103b and the amount frame 102b of the second label 200.

On the other hand, the black printing data of the third label 100 is fetched and stored in the K-1 area 26.

When a page of the printing data of label 200 stored in the K-2 area 27 is completely transferred, the printing data of label 100 is transferred from the K-1 area 26 to the printing data converter 28 for each line. As a result, a black image, i.e., the commodity name of "strawberry" and the amount of "¥300" are printed black in the commodity frame 103a and the amount frame 103a, respectively, of the third label 100.

The black printing data of the fourth label not shown following label 100 is fetched and stored in the K-2 area 27.

In similar fashion, the image data of odd-numbered and even-numbered labels are transferred and stored alternately in the K-1 area 26 and the K-2 area 27.

As described above, according to the first embodiment, the K head 4 for printing different printing data for each page is associated with two storage areas of the K-1 area 26 and the K-2 area 27 each for storing a page of printing data as bit map data, so that the printing data of the next label can be started to be stored in the storage area before complete transfer of the printing data of a label to the K head 4 through the printing data converter 28.

In the case where a page of black printing data can be stored during the one-page printing period of each head, the storage period following the printing period can be eliminated at the print timing of the K head 4. Also, even in the case where a page of black printing data cannot be stored during the one-page printing period of each head, at least the above-mentioned storage period can be shortened at the print timing of the K head 4.

As a consequence, the printing speed can be increased for continuous printing without being limited by the storage period for rewriting the printing data stored in the printing data storage unit 22.

Although the fist embodiment refers to the case in which the two storage areas of K-1l area 26 and K-2 area 27 are provided for the black-printing K head 4, the invention is not limited to such a case, but two or more storage areas may be provided for at least one of the color heads 1–3.

A second embodiment of the invention will be described with reference to FIGS. 6 and 7.

The second embodiment has the same configuration of the essential parts of the color printer as the first embodiment shown in FIGS. 2 and 3. The same component parts of the second embodiment are therefore designated by the same reference numerals as the corresponding parts in FIGS. 2 and 3, respectively.

FIG. 6 is a block diagram showing a circuit configuration of the essential parts of the color printer according to this embodiment.

Printing data of one page is produced and edited by an image processing unit 41 and is stored temporarily as bit map data in the storage area formed in the printing data storage unit 42, i.e., in a Y-1 area 43-1, a Y-2 area 43-2, ..., a Y-n area 43-n for yellow, an M-1 area 44-1, an M-2 area 44-2, ..., an M-n area 44-n for magenta, a C-1 area 45-1, C-2 area 45-2, ..., a C-n area 45-n for cyan, and a K-1 area 46-1, a K-2 area 46-2, ..., a K-n area 46-n for black.

The image processing unit 41 subjects the printing data stored in each area to parallel-serial conversion for each line through the printing data converter 28 and supplies the result to the head units 29 to 32, respectively.

The image processing unit 41 and the printer engine controller 33 are connected to the printing data storage unit 42 and the printing data converter 28 through the system bus 34. The embodiment shown in FIG. 6 is different from the embodiment of FIG. 3 in that the storage area in the image processing unit 41 is formed as a plurality of areas for each color other than black as well as for black. Image processing unit 41 and printing data converter 28 function together as a printing data write means for writing a next page of the printing data in the auxiliary page memories 43-2 ... 43-n, 44-2 ... 44-n, 45-2 ... 45-n and 46-2 ... 46-n while the printing data stored in the first page memories 43-1, 44-1, 45-1 and 46-1 is being printed, and also function together as a print control means for supplying the printing data to the printing head alternately and continuously from first page memories and correspoonding auxiliary page memories.

FIG. 7 is a diagram showing the flow of data transfer performed by the CPU of the image processing unit 41. First, step ST1 waits for a data transfer request from the printer engine controller 33. This waiting state can be interrupted by other processes.

Upon receipt of a data transfer request from the printer engine controller 33, the color to be transferred is selected on the basis of the data transfer request and the printing page is confirmed.

Then, an area to be read out is selected on the basis of the selected color and the confirmed printing page. In the case where the selected color is yellow and the printing page is the second page, for example, the Y-2 area 43-2 is selected as the area to be read out.

The leading line of unprinted data is transferred from the read-out area thus selected to the printing data converter 28 thereby to decide whether the printing is complete or not.

In the case where the decision is that the printing is not complete, the process is returned to step ST1.

In the case where the decision is that the printing is complete, on the other hand, the data transfer process is terminated.

The image processing unit 41 stores the printing data basically in the same manner as the image processing unit 21 according to the first embodiment. The printing data storage process of the image processing unit 41, therefore, will not be described below.

In the case where it is confirmed that unprinted data is not stored in the Y-1 area 43-1, the Y-2 area 43-2, ..., the Y-n area 43-n sequentially, the printing data of the color (yellow) of the next label is stored in the corresponding area as bit map data.

According to the second embodiment having this configuration, the printing data of yellow, magenta, cyan and black of the first label are sequentially stored in the Y-1 area 43-1, the M-1 area 44-1, the C-1 area 45-1 and the K-1 area 46-1. Then, the printing data of yellow, magenta, cyan and black of the second label are sequentially stored in the Y-1 area 43-2, the M-1 area 44-2, the C-1 area 45-2 and the K-1 area 46-2. In similar fashion, the printing data of each color of the third to n-th labels are stored sequentially in each area.

Upon complete storage of the printing data, the printing operation is started. The printing operation may alternatively be started when the second printing data of black, the last printing color, is stored in the K-2 area 46-2.

Description below will be made about the color of yellow. The other colors are processed concurrently in similar fashion.

First, the image processing unit 41 transfers each line of the printing data from the Y-1 area 43-1 to the printing data converter 28. As a result, a yellow image is printed on the first label.

Upon complete transfer of a page of printing data stored in the Y-1 area 43-1, each line of the printing data is transferred to the printing data converter 28 from the Y-2 area 43-2. A yellow image thus is printed on the second label.

The yellow printing data of the (n+1)th label, on the other hand, is stored in the Y-1 area 43-1.

Upon complete transfer of a page of printing data stored in the Y-2 area 43-2, each line of the printing data is transferred to the printing data converter 28 from the Y-3 area. As a consequence, a yellow image is printed on the third label.

On the other hand, the yellow printing data of the (n+2)th label is stored in the Y-2 area 43-2.

In similar fashion, the data transfer and storage are performed sequentially on rotation for each area.

As described above, according to the second embodiment, since a plurality of storage areas are provided for storing a page of printing data as bit map data respectively, a similar effect to the first embodiment is obtained, while at the same time accommodating the case in which the printing data of each color are different for different pages. Now, a third embodiment of the invention will be described with reference to FIGS. 8 and 9.

The configuration of the essential parts of the color printer according to the third embodiment is the same as that of the first embodiment shown in FIGS. 2 and 3, and therefore will be designated by the same reference numerals as the corresponding parts in FIGS. 2 and 3, respectively, and will not be described any further.

FIG. 8 is a block diagram showing a circuit configuration of the essential parts of the color printer according to the third embodiment. In the embodiment of FIG. 8, an intermediate printing data storage unit 57 is added to the embodiment shown in FIG. 6, and the remaining parts are configured in the same way as the embodiment of FIG. 6.

A page of printing data produced and edited by the image processing unit 51 is stored as bit map data temporarily in the storage areas formed in the printing data storage unit 52, including a Y-1 area 53-1, a Y-2 area 53-2, . . . , a Y-n area 53-n for yellow, an M-1 area 54-1, an M-2 area 54-2, . . . , an M-n area 54-n for magenta, a C-1 area 55-1, a C-2 area 55-2, . . . , a C-n area 55-n for cyan, and a K-1 area 56-1, a K-2 area 56-2, . . . , a K-n area 56n for black.

The image processing unit 51, as described later, transfers a block of a plurality of lines of printing data stored in each area to the intermediate printing data storage unit 57.

The intermediate printing data storage unit 57 has formed therein a Y2-1 area 58-1, a Y2-2 area 58-2, . . . , a Y2-n area 58-n for yellow, an M2-1 area 59-1, an M2-2 area 59-2, . . . , an M2-n area 59-n for magenta, a C2-1 area 60-1, a C2-2 area 60-2, . . . , a C2-n area 60-n for cyan, and a K2-1 area 61-1, a K2-2 area 61-2, . . . , a K2-n area 61-n for black, for storing a block of data including a plurality of lines, where n may be a numerical value constituting a sheet (page) of printing data or less than the particular numerical value according to the printing speed.

The printer engine controller 62, as a printing control means, cooperates with the image processing unit 51 to subject each block of printing data stored in each area of the intermediate printing data storage unit 57 to parallel-serial conversion and other processes for each line and supply the result to the corresponding one of the units 29 to 32.

Further, the printer engine controller 62 controls the print timing of the units 29 to 32 and executes the printing operation on the basis of the printing data supplied through the printing data converter 63.

The image processing unit 51 and the printer engine controller 62 are connected through the first system bus 64 to the printing data storage unit 52 and the intermediate data storage unit 57 on the one hand, and to the intermediate printing data storage unit 57 and the printing data converter 63 through the second system bus 65. Further, the printing data is supplied for each line from the intermediate printing data storage unit 57 to the printing data converter 63. Image processing unit 51 and printing data converter 63 function together as a printing data write means for writing a next page of the printing data in the auxiliary page memories 53-n, 55-2 . . . 55-n and 56-2 . . . 56-n while the printing data stored in the first page memories 53-1, 54-1, 55-1 and 56-1 is being printed, and also function together as a print control means for supplying the printing data to the printing head alternately and continuously from first page memories.

FIG. 9 is a diagram showing the flow of data transfer performed by the CPU of the image processing unit 51. First, step ST11 selects the color to be transferred on the basis of a predetermined sequence, searches the intermediate printing data storage unit 57 for an area corresponding to the selected color and thus decides whether there is any vacant area having no unprinted data.

In the case where the decision is that no vacant area is available, the process returns to step ST11.

In the case where the decision is that a vacant area is available, on the other hand, the page to be transferred is checked in the printing data storage unit 52 for the particular color, so that a block of unprinted data of the page to be transferred for which the selected color has been checked in the printing data storage unit 52 is transferred collectively to the vacant area.

Upon complete transfer, the decision is made as to whether the printing is complete or not. If the printing is not yet complete, the process returns to step ST11. When the decision is that the printing is complete, on the other hand, the data transfer is completed.

The printing data is printed and stored by the image processing unit 51 basically in the same manner as the black data are printed and stored by the image processing unit 21 according to the first embodiment. The printing and storage operation of the image processing unit 51, therefore, will not be described any more.

According to the third embodiment of this configuration, the printing data are stored in each area of the printing data storage unit 52 in the same manner as in the second embodiment described above.

Further, the printing data of the first block of the Y-1 area 53-1, the M-1 area 54-1, the C-1 area 55-1 and the K-1 area 56-1 storing the first page of printing data for each color is transferred sequentially to the Y2-1 area 58-1, the M2-1 area 59-1, the C2-1 area 60-1 and the K2-1 area 61-1 of the intermediate printing data storage unit 57.

In similar fashion, the second block, the third block and so on, of the Y-1 area 53-1, the M-1 area 54-1, the C-1 area 55-1 and the K-1 area 56-1 are transferred sequentially to the corresponding areas of the intermediate printing data storage unit 57.

The printing operation is started when all the first page of the printing data for each color has been transferred to the intermediate printing data storage unit 57, or as an alternative, when a predetermined number of blocks for each color has been transferred to the intermediate printing data storage unit 57 according to the printing speed.

Explanation will be made with reference to the case of yellow. Other colors are also processed concurrently in similar fashion. To facilitate the understanding, one page of printing data is assumed to be configured of n blocks.

First, the printer engine controller 62 transfers each line of the printing data from the Y2-1 area 58-1 of the intermediate printing data storage unit 57 to the printing data converter 63. As a result, a yellow image begins to be printed on the first label.

Upon complete transfer of a block of printing data stored in the Y2-1 area 58-1, the printing data are transferred from the Y2-2 area 58-2 for each line to the printing data converter 63.

When a block of the printing data stored in the Y2-1 area 58-1 is completely transferred to the printing data converter 63, the image processing unit 51 detects the Y2-1 area 58-1 as a vacant area in an area corresponding to yellow of the intermediate printing data storage unit 57, and transfers the leading block of printing data of the Y-2 area 53-2 of the printing data storage unit 52 collectively to the Y2-1 area 58-1.

The above-mentioned basic process is repeated sequentially. Upon complete transfer of one block each of all the printing data stored in the Y2-n area 58-n, the printing data are transferred to the printing data converter 63 for each line from the Y2-1 area 58-1. As a result, the yellow image begins to be printed on the second label.

At this time, the image processing unit 51 detects the Y2-n area 58-n as a vacant area in an area corresponding to yellow of the intermediate printing data storage unit 57, and transfers the last block of the printing data of the Y-2 area 53-2 of the printing data storage unit 52 collectively to the Y2-1 area 58-1. Upon complete transfer of the last block of printing data, the yellow printing data of the (n+2)th label is stored in the Y-2 area 53-2.

In similar fashion, operations of transfer and storage are performed on rotation for each area of the intermediate printing data storage unit and each area of the printing data storage unit.

As described above, according to the third embodiment comprising the intermediate printing data storage unit 57 divided into a plurality of areas each constituting a block including a plurality of lines of printing data (bit map data), the same effect is obtained as the second embodiment described above. At the same time, the image processing unit can transfer the printing data collectively in blocks but not for each line. A longer time is therefore allowed for other processes for an improved processing efficiency.

The number of areas corresponding to each color of the printing data storage unit 52 and the intermediate printing data storage unit 57, which is explained above by the same constant n, may of course be different between the printing data storage unit 52 and the intermediate printing data storage unit 57. Instead, an appropriate number of areas may be set respectively according to the balance between the memory capacity and the printing speed.

As described above, according to this invention, there is provided a color printer capable of increasing the printing speed in continuous printing without being limited by the storage period for rewriting the printing data stored in memory.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A printer comprising:

a plurality of printing heads arranged at a predetermined spatial interval with each other sequentially along a direction in which long printing paper is fed;

a plurality of page memories, each for storing printing data of one page for a corresponding said printing head;

means for sequentially printing an image on the printing paper based on said printing data of one page supplied from the page memory corresponding to a respective said printing head, said means including said printing heads;

at least one auxiliary page memory associated with at least one page memory of the plurality of page memories for storing printing data of a next page;

printing data write means for writing said next page of said printing data in said at least one auxiliary page memory while the printing data stored in a corresponding page memory is being printed; and print control means for supplying said printing data to each said printing head alternately and continuously from a corresponding page memory and a corresponding auxiliary page memory.

2. The printer according to claim 1, wherein said at least one auxiliary page memory comprises an auxiliary page memory for each corresponding said printing head.

3. The printer according to claim 1, wherein said plurality of printing heads print images of different colors.

4. A printer comprising:

a plurality of printing heads arranged at a predetermined spatial interval with each other sequentially along a direction in which long printing paper is fed;

a plurality of page memories, each for storing printing data of one page for a corresponding said printing heads;

means for sequentially printing an image on the printing paper based on said printing data of one page supplied from the page memory corresponding to a respective said printing head, said means including said printing heads;

at least one auxiliary page memory associated with at least one page memory of the plurality of page memories for storing printing data of a next page;

printing data write means for writing said next page of said printing data in said at least one auxiliary page memory while the printing data stored in a corresponding page memory is being printed;

an intermediate memory connected by a predetermined number of printing lines for each said printing head; and printing control means for transferring via said predetermined number of lines, said printing data from a corresponding page memory and an auxiliary page memory to the intermediate memory, and supplying the printing data sequentially to a corresponding said printing head from the intermediate memory.

5. The printer according to claim 4, wherein said at least one auxiliary page memory comprises an auxiliary page memory for each corresponding said printing head.

6. The printer according to claim 4, wherein said intermediate memory is provided for each block of said printing lines including said predetermined number of lines of the corresponding said printing head.

7. The printer according to claim 4, wherein said plurality of printing heads print images of different colors.

8. A color printer comprising:

A printing section including first, second, third and fourth printing heads arranged at a predetermined spatial interval with each other sequentially along a direction in which long printing paper is fed for printing yellow, magneta, cyan and black images, respectively;

a printing data storage section including a plurality of page memories for storing printing data of a plurality of pages corresponding to each said printing head;

at least one auxiliary page memory, associated with at least one page memory of the plurality of page memories, for storing said printing data of a next page;

means for supplying the printing data of one page to the first, second, third and fourth printing heads sequentially from corresponding ones of said plurality of page memories; and printing data writing means for writing said next page of said printing data in said auxiliary memory while the printing data of said one page is being printed.

9. A method of printing a plurality of page images on a long printing paper simultaneously, comprising the steps of:

arranging a plurality of printing heads sequentially along a direction in which long printing paper is fed at a predetermined spatial interval with each other;

supplying page image printing data from a plurality of page memories to corresponding ones of the printing heads;

printing the page images on the long printing paper based on the page image printing data supplied to each said printing head;

providing at least one auxiliary page memory in association with at least one page memory of the plurality of page memories, for storing at least two continuous said page image printing data corresponding to at least one said printing head;

writing a next page of said printing data in one of said page memory and said auxiliary page memory while the printing data stored in the other one of said page memory and said auxiliary page memory is being printed; and supplying said printing data to the corresponding said printing head alternately and continuously from a corresponding said page memory and auxiliary page memory.

* * * * *